Aug. 7, 1973        S. H. COWEN        3,751,323
APPARATUS FOR PRODUCING A CONTOURED NECK TOWEL
Original Filed Jan. 29, 1970        3 Sheets-Sheet 1
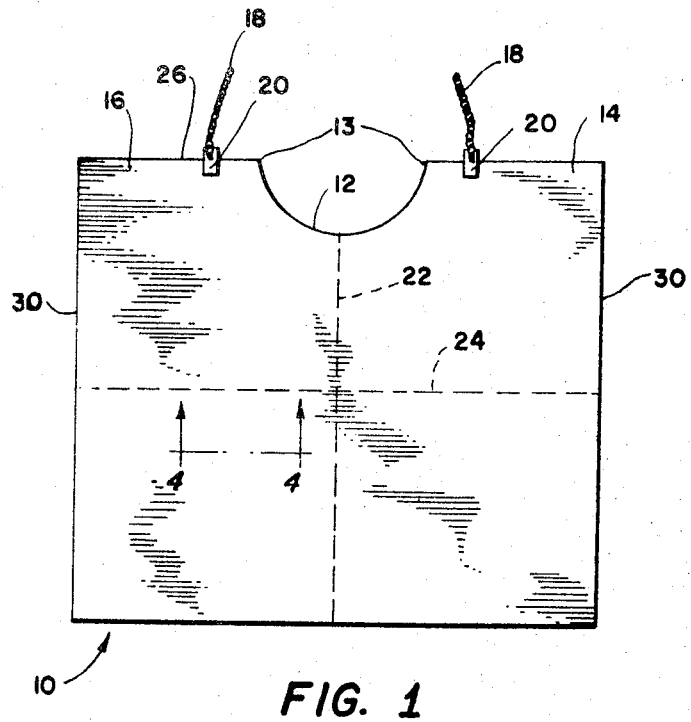
FIG. 1
FIG. 2
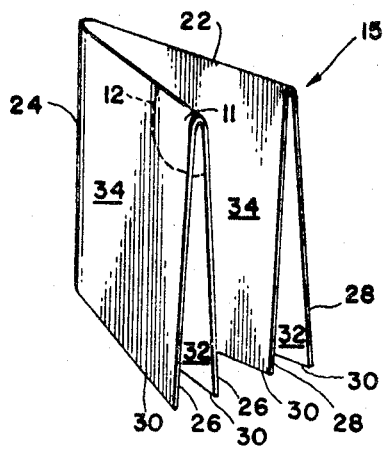
FIG. 3
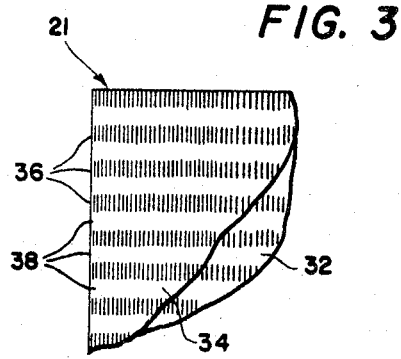
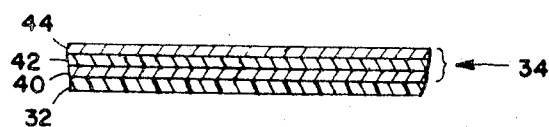
FIG. 4
INVENTOR
SAMUEL H. COWEN
BY Eugene M. Bond
ATTORNEY Aug. 7, 1973   S. H. COWEN   3,751,323
APPARATUS FOR PRODUCING A CONTOURED NECK TOWEL
Original Filed Jan. 29, 1970   3 Sheets-Sheet 3
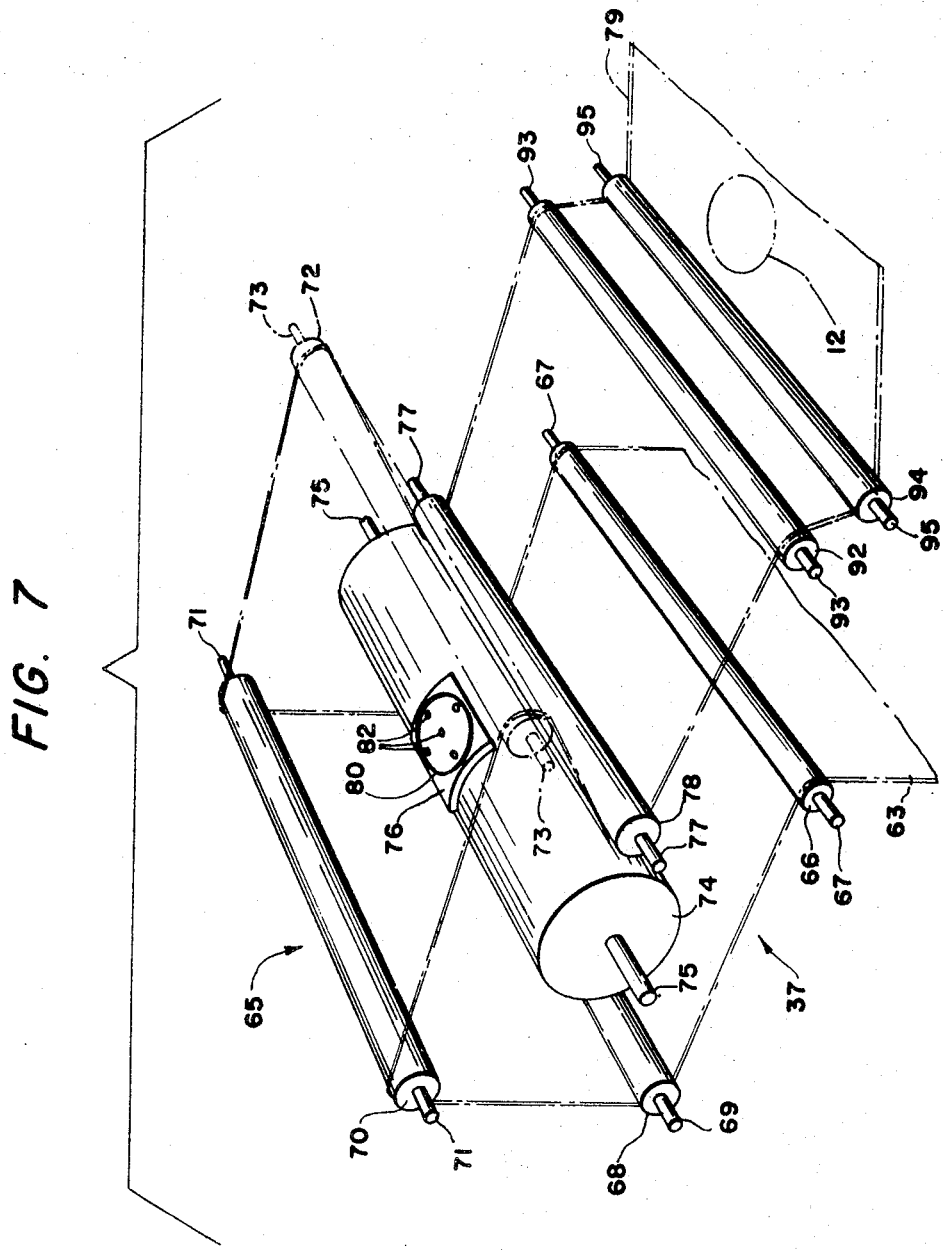
INVENTOR
SAMUEL H. COWEN
BY
ATTORNEY

United States Patent Office 3,751,323
Patented Aug. 7, 1973

---

3,751,323
APPARATUS FOR PRODUCING A CONTOURED NECK TOWEL
Samuel H. Cowen, Southfield, Mich., assignor to Chemed Corporation, Cincinnati, Ohio
Original application Jan. 29, 1970, Ser. No. 6,782, now Patent No. 3,619,816. Divided and this application June 9, 1971, Ser. No. 151,420
Int. Cl. B31b 1/00
U.S. Cl. 156—463                                    3 Claims

ABSTRACT OF THE DISCLOSURE

A contouerd neck towel is disclosed which is formed of a thin, flexible laminate having a layer of absorbent paper and a layer of liquid-impervious plastic material. A method is disclosed for consecutively forming a multiplicity of contoured neck towels, each of which includes a readily removable generally semicircular section. The apparatus hereof includes a first rotatable cylinder having a perforating member thereon and a second rotatable cylinder spaced therefrom for supporting a laminated sheet portion to be perforated.

---

This application for U.S. Letters Patent is a division of application Ser. No. 6,782, filed Jan. 29, 1970, now U.S. Pat. No. 3,619,816.

The present invention relates to a laminated contoured neck towel, to a process for the formation of the towel and to an apparatus for perforating a laminated towel.

Practice of the present invention provides a thin, flexible neck towel having an absorbent paper-like layer and a liquid-imprevious plastic-like film on one surface thereof. The towel may be easily and inexpensively formed by the present continuous process for rapidly producing large numbers of the neck towel, each in a folded configuration convenient for compact storage. Perforating apparatus provided by this invention is especially applicable to the process for producing the present contoured neck towel. The present towel may be usefully and readily adapted as a drape for covering and protecting clothing on the front portion of the upper torso of a dental patient or the like.

Generally stated, the present invention provides a contoured neck towel formed of a paper-plastic laminate having a readily detachable, generally semicircular section. The detachable section adjoins a finally used main portion of the towel at an arcuate, perforated border which is generally shaped to the contour of a human neck. The present towel may conveniently be used as a protective bib for clothing worn on the front upper torso of a person, such as a dental patient, by detaching the removable section, positioning the main portion on the front upper torso clothing and preferably thereafter securing the towel in position.

The present process generally includes the steps of superimposing an absorbent paper-like layer on a plastic-like film and adhering the layer to the film to form a laminated sheet. Thereafter, the laminated sheet is perforated by cutting with a generally circular perforating die. The perforated sheet is then longitudinally folded and subsequently transversely folded in an alternating fashion to produce a longitudinally folded laminate of a shape which may be described as accordion in nature. The thus perforated and folded sheet is next alternately transversely severed (A) along a line which includes a diameter of the area enclosed by the perforation and (B) along a line which is midway between consecutive perforated sections of the sheet.

The apparatus provided by the present invention, broadly stated, is an assembly for providing a generally circular perforation in a thin, flexible laminated sheet. Included in the apparatus are a first rotatable cylinder having a perforating member thereon and a second rotatable cylinder, spaced from the first rotatable cylinder for supporting a laminated sheet portion to be perforated.

Practice of the present invention will become more apparent from the following detailed description taken in connection with the accompanying drawings wherein like numerals refer to similar parts throughout the several figures.

FIG. 1 is a front view of an embodiment of the presnet contoured neck towel ready for use;

FIG. 2 is a perspective view of the contoured neck towel of FIG. 1 in folded configuration prior to being readied for use;

FIG. 3 is a partial front view of an embossed laminated contoured neck towel showing an absorbent layer and a liquid impervious layer of the laminate;

FIG. 4 is an enlarged partial cross-sectional view taken at line 4—4 in FIG. 1;

FIG. 7 is a perspective view of the perforating apparatus of the present invention.

Figure 5:
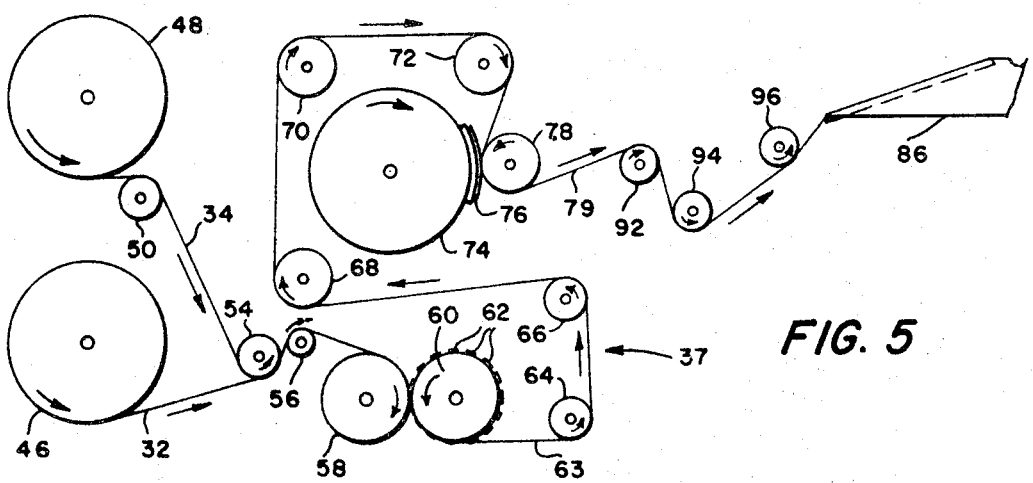
FIG. 5 is a schematic illustration of an intial phase of the present process.

In FIG. 1 there is shown contoured neck towel 10 in an embodiment of generally rectangular shape bordered by top edge 26, bottom edge 28, and two side edges 30. Imaginary center line 22 is shown parallel to sides 30 and midway therebetween. Towel 10 has arcuate identation 12 adjoining top edge 26 at points 13 thereon which are spaced equally distant from the intersection of an extension of center line 22 with a line colinear with top edge 26. Towel 10 includes shoulders 14 and 16 in opposite upper regions thereof, which are separated by indentation 12.

The towel is formed of a laminated construction which includes a layer of an absorbent mateiral such as tissue paper or the like having adhered thereto a liquid impervious film consisting of plastic or the like. As shown in FIG. 4 the laminate may include tissue paper 34 having adhered to a surface thereof plastic film 32. Paper 34 may be formed of a tissue paper construction having one or more plies, preferably of facial grade tissue. The strength and absorbency of paper layer 34 increases with the number of plies of tissue, as does the expense of the towel. The weight of the paper suitable for use in the laminate depends upon the number of plies to be used. If only a single ply of tissue is to be used to form the laminate, 10–16 pound tissue paper should be used. If two or more plies are to be used, 8–16 pound tissue paper should be used. Up to four plies of facial grade tissue paper maye be used. The paper layers should be integrally associated to form an intact sheet composed of these several layers as is conventional with facial tissue. The preferred tissue paper is a 12 pound facial grade tissue paper, and this weight of paper forms an exceptional towel material when laminated to polyethylene film having a thickness of about one mil. Because the use of three-ply tissue paper is found to provide an effective inexpensive towel, paper layer 34 as illustrated as a preferred embodiment having plies 40, 42 and 44.

Although plastic film 32 may be formed of numerous plastic materials, thermoplastic materials are found particularly suitable. Examples of suitable thermoplastic materials for this invention include nylon, polyvinyl chloride, polyesters, polyolefins and the like. Polyethylene is preferred for its ready availability and low cost. Preferably the film is a preformed polyethylene film having a thickness of at least 0.5 mil, and preferably about one mil.

Plastic film 32 may be bonded to paper 34 in a variety of useful ways including, for example, embossing. In FIG. 3 there is shown portion 21 of an embodiment of a construction of towel 10 having plastic film 32 adhered to paper 34 by a plurality of embossed strips 36 which appear in alternate fashion with non-embossed strips 38 therebetween.

During the period between manufacture and use of towel 10, storage space may conveniently be utilized by folding towel 10 generally into four quarters as shown in FIG. 2. It will be noted that the folded towel is illustrated in FIG. 2 in partly opened form for clarity, whereas in practice the folded towel is stored in substantially flat configuration. Towel 10 therefore is conveniently folded first along center line 22 and then along line 24 which is generally normal to line 22 and is approximately mid-way between top edge 26 and bottom edge 28. Prior to being readied for use, towel 10 includes generally semi-circular section 11, which is enclosed by top edge 25 and arcuate perforated edge 12. Although nearly half of section 11 is hidden from view in FIG. 2, its shape will be clearly understood by realizing that it is generally symmetrical about line 22.

Towel 10 may usefully protect a dental patient's clothing from bloody saliva and other offal normally encountered in the practice of dentistry. Towel 10 may be readied for such use in less than a minute by ripping along perforation 12 to remove section 11 and unfolding the towel into the shape shown in FIG. 1. Ripping and unfolding may be effected in either order, but preferably as given. Tthe towel, which now appears as in FIG. 1, is next placed on clothing worn by the patient over the front of his thorax section and is positioned with indentation 12 approximately superimposed on a contour neck line common to his throat and his trunk. Placement is preferably with the plastic-like layer adjacent the clothing. Thereafter, holding means such as string 18, having affixed thereon at the two extremities thereof clamps 20, is attached to top edge 26 of towel 10 by attaching one of clamps 20 to shoulder 14, passing string 18 behind the patient's neck, not shown, and securing the other of clamps 20 to shoulder 16 of towel 10. The length of string 18 may be adjusted to position indentation 12 at a desired distance from the patient's neck.

Although the towel of the present invention may be formed in numerous shapes and sizes the following dimensions are given, by way of illustration, for towel 10 of FIG. 1. A width of the towel, as at line 24, desirably ranges from about 12 to about 30 inches, preferably about 20 inches. The distance between top edge 26 and bottom edge 28 desirably ranges from about 10 to about 30 inches, preferably about 16 inches. Arcuate indentation 12 may have a radius of from about 2 to about 5 inches, preferably about 3 inches. Useful thicknesses of the absorbent material and the liquid impervious film thereunder depend on the specific materials in the laminate. Three ply tissue paper having an overall thickness of about 0.01 to about 0.05 inch is generally found to be sufficiently absorbent. Polyethylene film ranging from about 0.001 to about 0.005 inch in thickness provide a suitable liquid impervious film.

Figure 6:
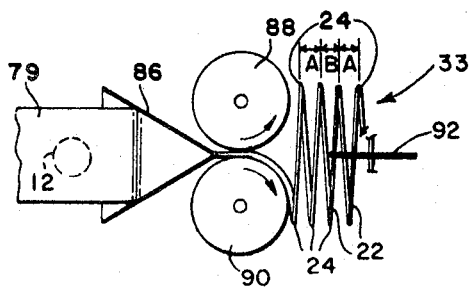
FIG. 6 is a schematic illustration, normal to FIG. 5 of a final phase of the process and includes a side edge view of a longitudinally and transversely folded laminated sheet.

Although the present towel may be formed by any suitable means, a particularly suitable process for forming the towels in mass production is also provided by this invention. The process will be described with reference to forming a laminated towel composed of a paper layer and a a plastic film. As shown in FIGS. 5 and 6, from plastic sheet supply roll 46 is unrolled a short section of plastic film 32, and from absorbent paper supply roll 48 is withdrawn sufficient paper 34 to reach roller 54. Laminated sheet 37, which comprises plastic sheet 32 and paper sheet 34, is threaded around the various rollers, as shown, to driving rolls 88 and 90. A continuous, periodically folded laminated sheet portion 33 is delivered therefrom and is thereafter severed into prefolded contoured neck towels of the present invention by cutting means illustrated as blade 92.

Laminate portion 35 is first formed of paper sheet 34 received from paper supply roll 48 via guide roll 50 and from plastic film 32 received from supply roll 46, by laminating rolls 54 and 56. Laminate portion 35 then passes through adhering rolls 58 and 60 where plastic film 32 is adhered to paper layer 34 as by embossing with relief strips 62. The now adhered laminate next passes over one or more guides illustrated as guide rollers 64, 66, 68, 70 and 72, around which the laminate is maintained in proper tension by any convenient means. The adhered laminate then passes between perforating rollers 74 and dummy roller 78. Roller 74 is provided with means 76 for perforating laminates formed of a paper layer and a plastic film. In this step the laminate receives perforated contour line 12 for two contoured neck towels juxtaposed on the laminate and having top edge 26 in common. Thereafter perforated laminate portion 79 is passed around guide and tension rollers, such as rollers 92, 94 and 96, to longitudinally folding means illustrated diagrammatically as "A" frame 86, where the perforated sheet is folded longitudinally along a center line thereof corresponding to line 22 on a single towel in FIGS. 1 and 2. The longitudinally folded sheet then passes between drive rollers 88 and 90 which alternately transversely fold the sheet as at line 24 shown for a single towel in FIGS. 1 and 2. The thus processed sheet is delivered from rollers 88 and 90 in a configuration which viewed from edge 22, as shown, may be described as of accordion shape or of a high frequency sawtooth wave pattern. The thus processed sheet of laminated towels is then transversely severed, as at top edge 26 and bottom edge 28 of towel 10 by cutting means 92 which is preferably a conventional reciprocating saw blade. Other cutting means known to the art may be used, as desired.

Figure 8:
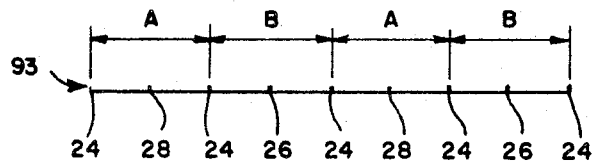
FIG. 8 is a schematic edge view of the folded portion of the laminated sheet of FIG. 6 in an unfolded configuration.

The relative orientation of consecutively produced and adjoining towels disposed in the wave-like configuration of FIG. 6 on folded portion 33 of laminated sheet 37 are further illustrated in FIG. 8, wherein the "wave" is shown outstretched. By referring to FIGS. 1 and 8 it will be seen that repeated portion A—B—A—B of the uncut sheet contains therein a sequence of units such as a first towel 10 adjoined to a second towel 10 at common top edge 26. To the second towel 10 there is adjoined a third towel 10 at common bottom edge 28. Edges 26 and 28 are subsequently cut by cutting means 92 against which the advancing sheet is forced by energy derived from rolls 88 and 90.

The apparatus of this invention is an assembly for perforating an advancing sheet of thin laminate formed of at least one layer of a plastic film which is adhered to a surface of at least one layer of paper-like material.

Although the present apparatus may be used for perforating various designs in numerous such laminates for a variety of purposes, the apparatus will be illustrated herein with reference to forming perforated circles in a relatively long continuous sheet from which large numbers of the present laminated contoured neck towel may be formed. Such an embodiment is shown in FIG. 7 as perforating apparatus 65 having laminated sheet 37 threaded therethrough. Apparatus 65 includes as an essential element thereof relatively large and generally cylindrical roller 74 which is desirably slightly longer than a width of laminated sheet 37 to be perforated by the apparatus. Roller 74 has projected therethrough small diameter rod 75 which protrudes from the center of each of two opposite generally circular side sections of the roller. The protruding portions of rod 75 are for supporting roller 74 in unshown sprockets in a frame therefor, at least one of which sprockets is desirably provided with means for rotating, at a preselected speed, roller 74 in synchronism with drive means for such sprockets and with advancing laminate 37. Roller 74 is also provided with one or more die plates such as rectangular arcuate plate 76 on a cylindrical surface of the roller. Plate 76 includes a cutting member such as sharp edged discontinuous circular ridge 80 which extends radially outward from arcuate plate 76. Ridge 80 may be formed of, or coated with, any durable, edge-retaining material, preferably a metal alloy such as case hardened stainless steel, Stellite (a trademarked alloy by Union Carbide Corporation) or the like. Plate 76 may be secured to roller 74 by any conventional means such as a plurality of threaded fasteners 82.

Apparatus 65 includes small cylindrical roller 78 against which laminate portion 63 to be perforated is pressed by sharp edged ridge 80 for cutting perforated circle 12 in the laminate. Roller 78 is also provided to maintain sufficient tension on laminate 37 to ensure proper perforation thereof. Roller 78 is provided with rod 77 similar to rod 75 for supporting thereof.

Means not shown are desirably provided to maintain a controlled preselected spacing between rollers 74 and 78 for suitable perforation of the laminate.

Apparatus 65 further includes a plurality of rotatable cylinders such as small rollers 66, 68, 70 and 72 for guiding and maintaining tension on laminate 37 prior to perforation thereof. The rollers are affixed with sprocket insertable rods, 65, 69, 71 and 73 in a manner similar to rods 75 and 77. Similar rotatable cylinders for guiding and maintaining tension on laminate 37 after perforation thereof are provided, such as small rollers 92 and 94, similarly equipped with rods 93 and 95.

The rotatable cylinders of the present apparatus may be formed from numerous materials including ceramic, wood, rubber and various metals. The rods are desirably formed of steel or other durable alloys which tend to provide long periods of trouble free operation.

It is to be realized that the foregoing description is given merely by way of illustration and that various modifications may be made thereto without departing from the spirit of this invention.

I claim:
1. An apparatus for processing a thin flexible laminated sheet formed of an absorbent paper-like layer and a plastic-like film disposed thereon, said apparatus comprising in combination:
(A) means for successively perforating said laminated sheet proximate a first series of imaginary lines sequentially spaced thereon, each of said lines corresponding to a common top edge of each of two towel sections adjoined at one of said imaginary lines on said sheet;
(B) a first rotatable cylinder adapted to rotate in response to driving means therefor, said cylinder having a perforating member which is disposed on a cylindrical surface thereof and which is secured thereto by securing means;
(C) a second rotatable cylinder spaced from the first cylinder for supporting said laminate at least on a portion of a surface thereof opposite a portion of laminate the surface of which may be first contacted by said perforating member;
(D) means for feeding said laminated sheet from the perforating means to said second rotatable cylinder in proper orientation and under sufficient tension to effect suitable perforation of the laminate;
(E) means for suitable withdrawing said laminated sheet from said second rotatable cylinder;
(F) means for receiving said perforated laminated sheet and for continuously longitudinally folding the perforated sheet to juxtapose a portion of the plastic-like layer from one side of the longitudinal fold with the opposite side disposed plastic-like portion;
(G) means disposed for secondly alternately folding the longitudinally folded sheet along a second series of imaginary lines, wherein each of said lines in said second series is
 (1) generally normal to said longitudinal fold, and
 (2) generally mid-way between two imaginary lines corresponding to a top edge and a bottom edge of a single towel section on the sheet, so as to form the advancing sheet into a saw-tooth like wave pattern of high frequency; and
(H) severing means disposed for alternately and completely severing the advancing wave-like sheet
 (1) at a first imaginary line corresponding to the common top edge of each of two towel sections adjoined at said first imaginary line on the sheet, and thereafter
 (2) at a second imaginary line corresponding to the common bottom edge of each of two towel sections adjoined at said second imaginary line on said sheet.

2. The apparatus of claim 1 wherein
(A) said perforating member is a cutter plate which has a sharp-edged, generally circular discontinuous ridge on a surface thereof opposite a cutter plate surface adjacent the cylindrical surface of said cylinder,
(B) said sheet is to be processed into at least two contoured neck towels, each having a finished towel arcuate perforation indented from a top edge thereof.

3. The apparatus of claim 1 wherein each of said feeding means and said withdrawing means includes at least one rotatable cylinder.

References Cited
FOREIGN PATENTS

| | | | |
|---|---|---|---|
| 2,789,640 | 4/1957 | Belden | 225—2 X |
| 3,263,882 | 8/1966 | Nugent et al. | 225—2 |
| 2,502,112 | 3/1950 | Walker | 156—252 X |
| 3,001,646 | 9/1961 | Cooper | 206—58 |
| 2,424,680 | 7/1947 | Doyle | 206—57 |
| 787,357 | 4/1905 | Davis | 206—57 |
| 1,889,689 | 11/1932 | Millis | 206—57 |

ALFRED L. LEAVITT, Primary Examiner

D. A. SIMMONS, Assistant Examiner

U.S. Cl. X.R.

156—200, 204, 227, 250, 253, 459, 461, 474, 510, 513, 516; 206—57; 270—39